June 22, 1926.
E. D. SELDOMRIDGE
TIRE FENDER
Filed Oct. 19, 1925
1,589,990
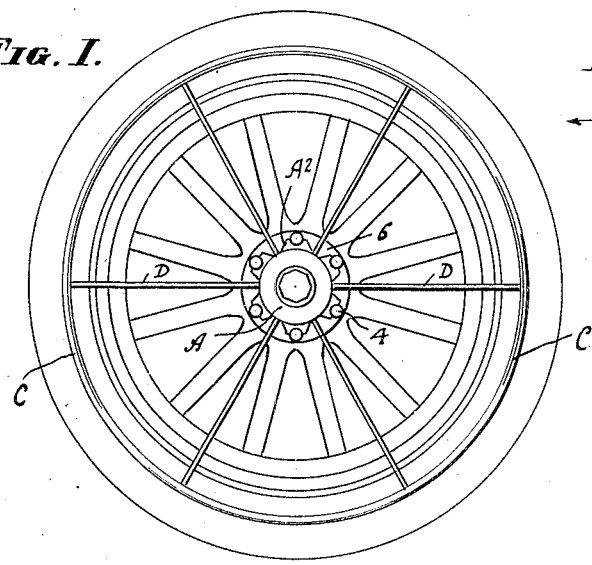
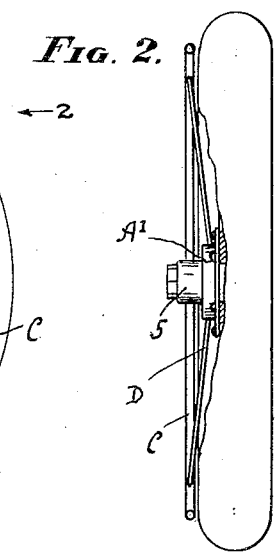
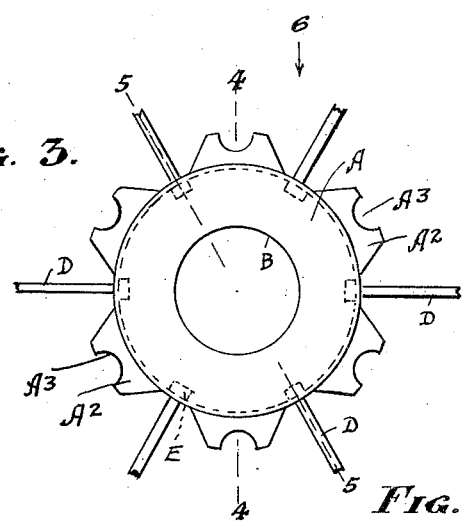
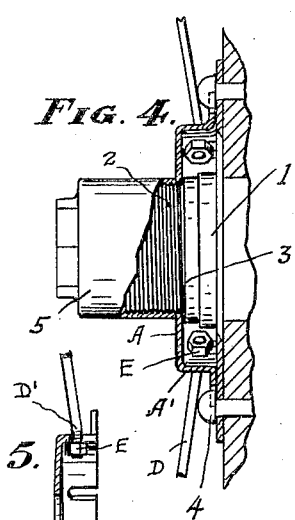
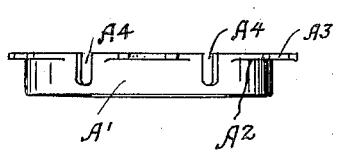
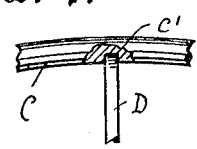
INVENTOR
EDWARD D. SELDOMRIDGE
BY Thomas L. Ryan
ATTORNEY Patented June 22, 1926.

1,589,990

UNITED STATES PATENT OFFICE.

EDWARD D. SELDOMRIDGE, OF MUNCIE, INDIANA.

TIRE FENDER.

Application filed October 19, 1925. Serial No. 63,231.

This invention relates to improvements in means to protect the outer surfaces of automobile wheels, and has reference especially to fender devices intended to protect the tire from being scratched or scuffed. The rubber tire as now almost universally used for automobile wheels, presents a relatively large exposed lateral surface, which is subject at all times to injurious knocks and bruises.

The object of the present invention is to provide a device to protect the tire from injury when the wheel of the car is moved to contact with the sidwalk curbing, and to fend or ward off flying objects which otherwise might strike and injure the tire. More specific aims of the invention are to provide a device of the kind described which is light in weight, rugged and durable, economical of manufacture, and which is capable of being easily installed for use on the automobile of standard type.

The objects of my invention are accomplished by, and the invention is embodied in the new construction, combination and arrangement of parts shown in the accompanying drawings, and described in the following specification.

The several parts of the invention are identified by suitable characters of reference applied thereto in the different views in the drawings, in which—

Figure 1 is a front view of my invention applied to position on an automobile wheel of standard make.

Figure 2 is a side view of Figure 1, taken in the direction of the arrow 2.

Figure 3 is an enlarged view of the frame member, the lower portions of the support rods being shown.

Figure 4 is a cross section view taken on the line 4—4 in Figure 3, there being shown a portion of the wheel hub.

Figure 5 is a cross section view taken on the line 5—5 in Figure 3.

Figure 6 is a view of Figure 3 taken in the direction of arrow 6 in Figure 3.

Figure 7 is a fragmentary view showing detail of connection of the protector ring to support rod.

This invention contemplates the providing of a resilient annular member, a frame member adapted to be removably secured to the vehicle wheel, and support elements between the annular member and the frame member, to retain the former at position closely adjacent to the lateral face of the wheel tire.

The structure shown in the present specification, and which practically embodies my invention, is applicable to automobile wheels generally in which the hub has the usual internally threaded cap which is screwed to tightened position on the annular shoulder which forms a part of the wheel hub.

The frame member, which may be designated as the frame-piece A is made of sheet steel of suitably heavy gauge and is of the formation in cross section as shown in Figures 4 and 5, being provided with annular wall $A^1$ that extends at a right angle from said frame piece. Formed integrally with the inner portion of said wall are spaced flanges $A^2$ which are adapted to rest directly in engagement with the face of the circular body-plate of the wheel hub 1.

Centrally of the slightly convexed body portion of the frame piece, is a bore B of diameter to easily slip over the threaded body portion 2 of the wheel hub. The annular edge of said bore B becomes seated on the shoulder 3 of the wheel hub. Semicircular recesses $A^3$ provided in the flanges $A^2$ are spaced to register with, and are of formation to fit in engagement with the heads 4 of the hub cross-bolts of the wheel. The frame-piece thus formed, and placed in engagement with the body-plate of the hub, is capable of being easily held at correct and immovable position.

The body portion of said frame-piece being slightly convexed, the action of the hub cap 5, when it is screwed to tightened position against the said frame-piece, is to clamp the device as an entirety securely in place, the faces of the flanges being at close engagement with the hub plate, and the edge of the bore B being in engagement with the shoulder of the hub.

Spaced in the annular wall $A^1$, are openings $A^4$ in which are received the inner ends of the members or rods that support the protector ring.

In a fender device constructed in accordance with my invention, for a wheel having a tire thirty inches in diameter the diameter of the protector ring C is about twenty five inches. This protector ring is made of a single-length of spring steel about one half inch in diameter, having its ends joined by welding. In shallow recesses spaced for the desired number of radially disposed support rods D are suitable shallow recesses $C^1$ into which the outer ends of the support rods are threaded, and then welded. These rods are also of spring steel and are about five sixteenths of an inch in diameter, the inner end of each rod being threaded and provided with a nut E, and having the bend D¹. No machine work, other than the blanking and stamping of the frame-piece into the form shown, except as above described is required in completing the parts of my invention. To assemble the said parts the free ends of the rods D are disposed in the seat portions of the recesses A⁴. Then with screwing the nuts E to tightened position the fender device is complete and in readiness for application to position on the wheel.

It will be understood that the angularity of the bend of the support rods is varied to accord to the diameter of the tire, and to the width of the tire, and to the depth of the wheel hub, the said bend being such that when the frame-piece is at secured position on the wheel hub, the ring C occupies position about three sixteenths or one eighth of an inch from the lateral face of the tire.

The several parts may be finished in enamels, or may be polished and nickel plated. To install the invention at operative position, the cap 5 of the wheel hub is first removed. The frame piece is then slipped to position on the hub, its flanges A² being at rest directly in engagement with the circular body plate 6 of the wheel hub, and its recesses A³ being at engagement with the heads 4 of the hub cross bolts. The hub cap is then screwed to tightened position, the rim of the bore B coming to rest on the annular shoulder of the hub, the frame piece thus being clamped to tenacious engagement with the wheel hub where it is held securely.

This fender device serves to protect the lateral surface of the tire when the wheel is driven to close proximity with the sidewalk curbing, or against any other object or surface, thereby protecting the tire from being scratched, bruised, or scuffed. Also the tire is protected from being bruised or scuffed by being struck by the projecting part of another vehicle with which it might accidentally come into contact. The ring and the support rods being of resilient steel, the device as an entirety is capable of yielding to any strain imposed upon it by its contact with the curbing, or by a letting down of the wheel in case of tire deflation. Being removable simply by the unscrewing of the hub cap, it is easily demounted when possible removal of the tire from the wheel rim may be necessary. For further shielding the automobile wheel it is intended that a disk of gauze or other type of fabric, woven or of pressed material, may be secured to the support rods and ring, thereby protecting the wheel from flying particles of dust, or mud, or any other light objects.

I am aware that modifications and changes may be made in the formation of the several parts, and in the details of construction and connections, within the scope of the invention as the same is defined in the appended claims, without departing from the spirit of the invention or sacrificing any of its advantages.

What I claim as my invention, and desire to secure by Letters Patent, is—

1. A fender device of the kind described, comprising a resilient annular member of diameter less than that of the tire, a frame member adapted to be secured to the wheel hub, and resilient support members between the annular member and the frame member to retain the former in position closely adjacent to the tire.

2. A fender device for automobile wheels, comprising a yieldable resilient ring of diameter less than that of the tire, a frame member removably secured to the wheel, and yieldable resilient supports between the frame member and the said resilient ring.

3. A fender device of the kind described, comprising a resilient ring of diameter less than that of the tire a frame member removably secured to the wheel hub, and resilient supports between the said ring and the said frame member, to support the former in position closely adjacent to the lateral face of the tire.

4. A fender device for vehicle wheels, comprising a frame piece adapted to be clamped securely to the wheel hub and having spaced slots therein, an annular resilient ring of diameter less than that of the wheel tire, radial resilient rods having their outer ends secured to the said ring and their inner ends adapted to be inserted in said slots, and means to draw and secure the said rods to the said frame piece.

EDWARD D. SELDOMRIDGE.